Patented Nov. 6, 1934

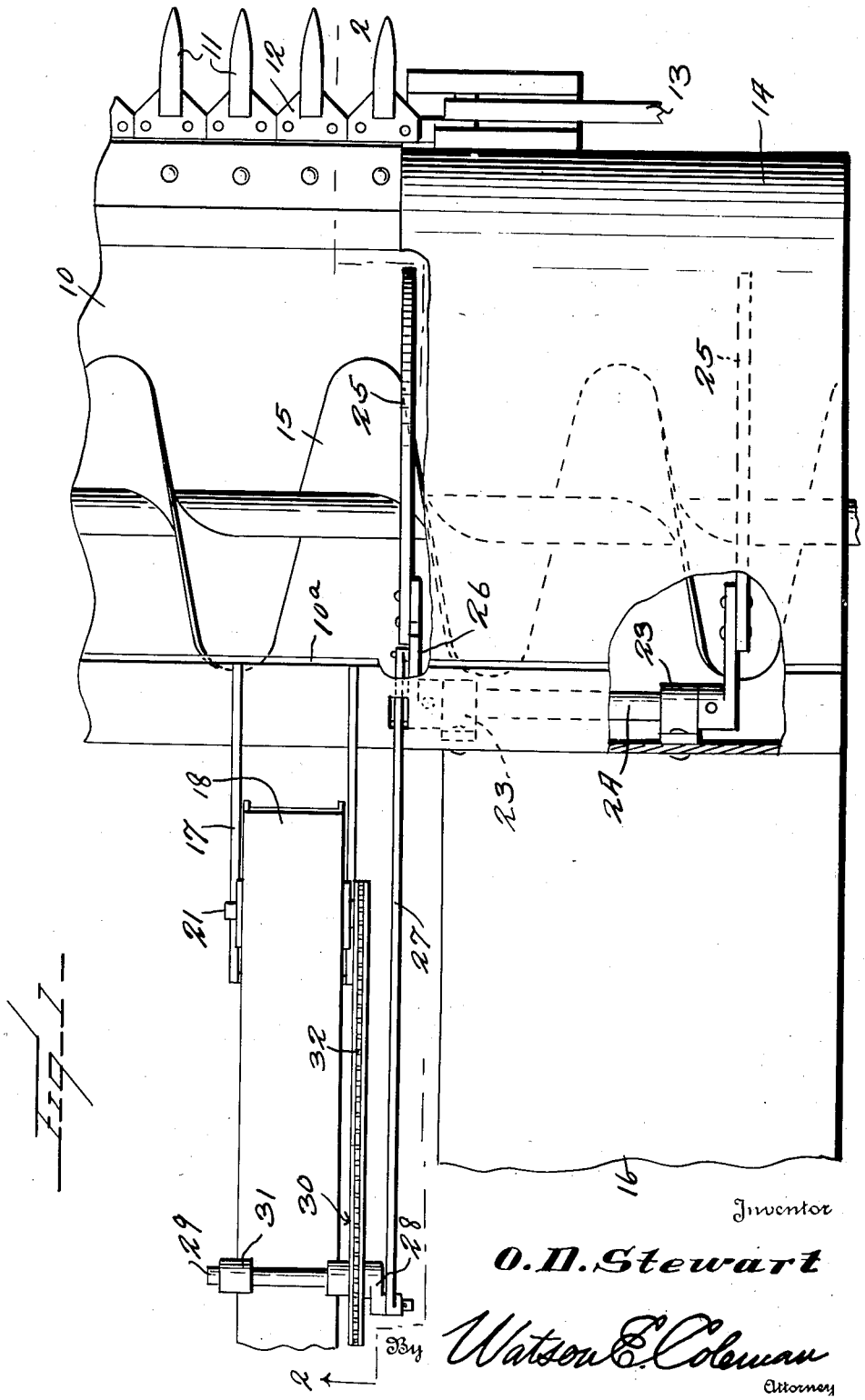

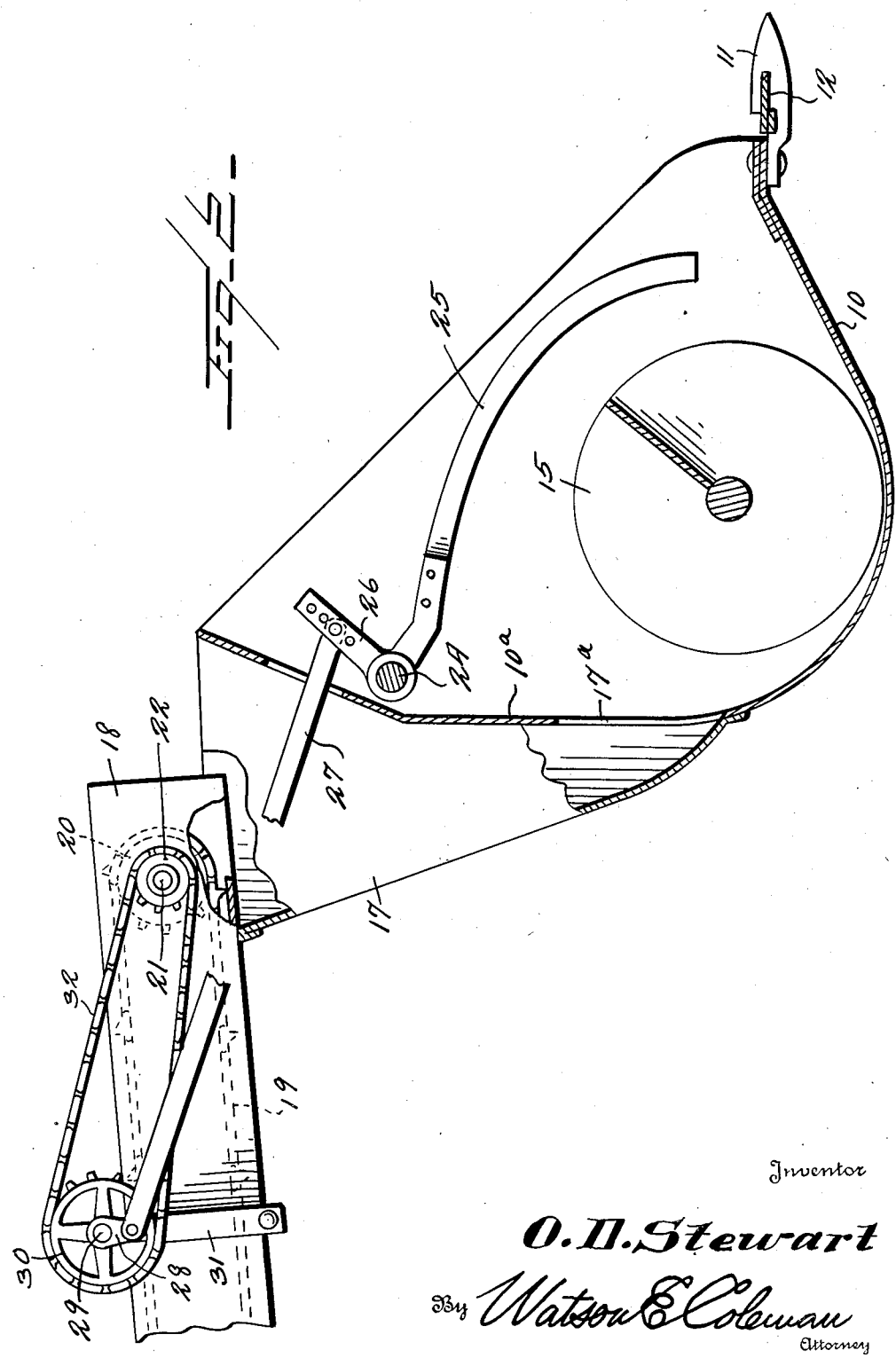

1,980,108

UNITED STATES PATENT OFFICE 1,980,108

ANTICLOGGING ATTACHMENT FOR GRAIN AUGERS

Oscar D. Stewart, Underwood, N. Dak.

Application July 1, 1933, Serial No. 678,671

5 Claims. (Cl. 56—122)

This invention relates to devices to be applied to a combined harvester and thresher of a certain type and particularly to an appliance which will prevent the grain auger from choking up as it takes the grain to the cylinder of the threshing machine. Augers in this type of threshing machine are very liable to choke up and the general object of the invention is to provide a device for this purpose which includes beaters acting to beat the grain down into the auger at the point where the auger delivers the grain to the feeder of the threshing machine.

A further object is to provide means whereby the beaters may be oscillated at a relatively slow speed by certain mechanism in the threshing machine.

Other objects will appear in the course of the following description.

My invention is illustrated in the accompanying drawings, wherein:—

Figure 1 is a top plan view of a portion of a combined harvester and thresher showing a portion of the trough, the cutting knives thereof and the housing over one end of the trough, the hood being partly broken away;

Figure 2 is a section on the line 2—2 of Figure 1.

Referring to these drawings, 10 designates the usual trough or auger housing of a combined harvester-thresher and 11 the fingers of the finger bar.

The reciprocating knives 12 operate between said fingers in the usual manner and are reciprocated by any suitable means, as for instance, by the connecting rod 13. At one end of the housing or trough 10, there is provided the usual hood 14 which extends upward from the front of the housing or trough and rearward to the rear wall 10a of the housing. Operating within the housing or trough 10 is the auger 15 mounted on the usual shaft and operated in any suitable manner, which auger carries the grain as it is cut by the knives 12 along the trough 10 to the feeder. The feeder is not shown but the usual separator housing 16 is illustrated.

In harvesters of this type, the rear wall of the trough or housing is formed with an opening 17a into which a hopper-shaped portion 17 discharges. A return elevator, the housing of which is designated 18, normally rests upon the rear wall of the hopper 17 and an endless chain conveyor shown in dotted lines in Figure 2 and designated 19 operates to return such grain as may have been blown over the sieves. The endless conveyor 19 passes over a sprocket wheel 20 mounted upon a shaft 21 which also carries upon it the sprocket wheel 22.

Mounted in bearings 23 attached to the rear wall of the trough or housing 10 and beneath the hood 14 is a short shaft 24 which carries upon it the two outwardly and downwardly curved fingers 25. One of these fingers is disposed more or less adjacent the outer end wall of the trough or housing and beneath the hood 14 while the other finger is disposed closely adjacent the open end of this hood as shown in Figure 1. These fingers are to be reciprocated to thereby beat the grain down into the screw or auger 16 and to this end the shaft 24 is provided with the outwardly projecting arm 26.

This arm is perforated at a plurality of points for adjustable engagement with a link 27. This link extends upward and rearward and is connected to a crank 28 mounted upon a shaft 29 carrying the sprocket wheel 30. This shaft 29 is mounted in bearings supported by a bracket 31 clamped upon the return conveyor casing 18. A sprocket chain 32 passes over the sprocket wheel 30 and around the sprocket wheel 22 and thus it will be seen that the fingers 25 are oscillated by power transmitted from the endless chain 19.

It is to be particularly noted that the sprocket wheel 22 is much smaller than the sprocket wheel 30 so that the sprocket wheel 30 operates at fewer revolutions per minute than the sprocket wheel 22 and thus slows down the speed of oscillation of the fingers or feeders 25. Preferably the sprocket wheen 30 is twice the diameter of the sprocket wheel 22.

It is to be understood that the elevator housing or trunk 18 with the elevator 19 is not part of my invention but is commonly found on certain types of harvester-threshers but that my invention consists in disposing within the hooded portion of the trough or housing 10 the two beaters or feeders 25 which are oscillated to force the grain into the augers.

I do not wish to be limited to driving the feeders or fingers 25 by means of the shaft 21 as obviously the crank shaft 29 could be driven from other shafts such as the reel shaft or auger shaft.

This device prevents the auger from choking up when the auger takes the grain into the cylinder of the threshing machine. It will be seen that it is particularly simple, that it may be easily attached to combined machines of the type illustrated and that it has been found thoroughly effective in practice.

It will be noted that I have illustrated the fingers 25 as being disposed within the hooded portion of the trough 10. The cut grain is carried by the auger 15 to the rear, that is, to the cylinder. The cylinder is back of and below the hooded end of the trough. It makes no difference how or where the cut grain is carried in the unhooded portion of the trough 10, whether on top, under or behind the auger until this cut grain reaches the hooded end of the trough. There the cut grain must go under the auger in order to get into the cylinder and without the provision of the fingers 25 and their beating action, cut grain would lodge under the hood and over the auger until it clogs the machine up to a degree which causes a stoppage of the machine, oftentimes very suddenly and solidly. With my invention, however, the grain cannot thus clog the machine as it is continuously pushed down into the auger which puts it into the cylinder.

While I have illustrated certain details of construction, I do not wish to be limited thereto, as it is obvious that many minor changes might be made therein without departing from the spirit of the invention as defined in the appended claims.

I claim:—

1. The combination with the housing and auger of a combined harvesting and threshing machine, of means oscillating in a plane at right angles to the plane of the axis of the auger and forcing the grain into the auger and means exterior to the auger for oscillating said means.

2. The combination with the housing and auger of a combined harvesting and threshing machine, of oscillating means for forcing the grain into the auger including a plurality of pivoted fingers operating in a plane at right angles to the axis of the auger and disposed within the housing, and power operated means for oscillating said fingers.

3. In combination with the housing and auger of a combined threshing and harvesting machine, the housing having a hood at one end, of means disposed within said hood for forcing the grain into the auger and including oscillating members oscillating in planes at right angles to the longitudinal axis of the auger, and power operated means for oscillating said members.

4. The combination with the housing and auger of a combined threshing and harvesting machine, and a return elevator therefor, the housing having a hood at one end, of a shaft mounted upon the rear wall of the housing beneath said hood, outwardly and downwardly curved fingers mounted upon said shaft and extending over the auger, an arm on the shaft, a crank shaft operatively connected to the mechanism of the threshing machine to be driven thereby, and a link connecting the crank on the crank shaft to the arm.

5. The combination with the auger housing, auger and return elevator of a combined harvester and thresher, the housing having a hood at one end, of a shaft mounted beneath said hood on the rear wall of the housing, outwardly and downwardly extending fingers mounted on the shaft for oscillation thereby, an arm extending outward from the shaft, a sprocket wheel upon which the elevator is mounted and having outwardly extending shaft, and a sprocket wheel on said shaft having driving connection with the crank shaft, the sprocket wheel on the crank shaft being larger than the first named sprocket wheel, and a link between the crank shaft and said arm.

OSCAR D. STEWART.